(12) United States Patent
Tsung et al.

(10) Patent No.: US 6,585,628 B1
(45) Date of Patent: Jul. 1, 2003

(54) CUTTER TOOL ASSEMBLY AND SYSTEM

(75) Inventors: Wei-Jiung Tsung, Fort Wayne, IN (US); Frederick E. Lincoln, Fort Wayne, IN (US); Quang T. Hang, Fort Wayne, IN (US)

(73) Assignee: Dana Corporation, Toldeo, OH (US)

( * ) Notice: Subject to any disclaimer, the term of this patent is extended or adjusted under 35 U.S.C. 154(b) by 67 days.

(21) Appl. No.: 09/863,090

(22) Filed: May 22, 2001

(51) Int. Cl.$^7$ .............................. B23Q 3/157; B23C 5/16
(52) U.S. Cl. .............................. 483/9; 408/16; 409/131; 409/234; 483/1; 700/169; 700/179
(58) Field of Search .................. 409/131, 234; 377/15, 676, 835, 481; 702/187, 62.1; 340/680; 356/602; 483/9, 8, 1, 5, 10; 408/16; 144/114.1; 700/179, 160, 169

(56) References Cited

U.S. PATENT DOCUMENTS

| | | | |
|---|---|---|---|
| 4,588,339 A | 5/1986 | Bilz | 409/234 |
| 4,720,907 A | 1/1988 | Rapp | 29/568 |
| 4,742,470 A | 5/1988 | Juengel | 364/474 |
| 4,809,426 A | 3/1989 | Takeuchi et al. | 29/568 |
| 4,856,177 A | 8/1989 | Takeuchi et al. | 29/568 |
| 4,890,306 A * | 12/1989 | Noda | 377/15 |
| 5,086,590 A * | 2/1992 | Athanasiou | 408/16 |
| 5,257,199 A * | 10/1993 | Tsujino et al. | 52/146 |
| 5,787,018 A * | 7/1998 | Bolan et al. | 702/187 |
| 5,906,460 A * | 5/1999 | Link et al. | 356/602 |
| 6,029,722 A * | 2/2000 | Englert | 144/114.1 |
| 6,072,146 A * | 6/2000 | Matuschek et al. | 219/110 |
| 6,257,077 B1 * | 7/2001 | Patterson | 340/680 |
| 6,360,136 B1 * | 3/2002 | Lamers | 483/8 |

FOREIGN PATENT DOCUMENTS

| | | | | |
|---|---|---|---|---|
| DE | 226813 | * | 9/1985 | 483/9 |
| DE | 3518902 | * | 11/1986 | 483/9 |
| DE | 3919699 | * | 1/1991 | 483/9 |
| EP | 155662 | * | 9/1985 | 483/9 |
| EP | 0881552 A2 | * | 5/1998 | 483/9 |
| JP | 102650 | * | 6/1983 | 483/9 |
| JP | 0015058 | * | 1/1987 | 483/9 |
| JP | 63-185546 | * | 8/1988 | 483/9 |
| JP | 6-31529 | * | 2/1994 | 483/9 |

* cited by examiner

*Primary Examiner*—William Briggs
(74) *Attorney, Agent, or Firm*—Taylor & Aust, P.C.

(57) ABSTRACT

A cutter tool assembly includes a cutter head having an axial end face with an axially extending recess in the end face. A plurality of cutter blades are carried by and extend axially from the end face of the cutter head. A non-volatile memory device is disposed within the recess and affixed to the cutter head.

24 Claims, 2 Drawing Sheets

CUTTER TOOL ASSEMBLY AND SYSTEM

BACKGROUND OF THE INVENTION

1. Field of the Invention

The present invention relates to cutter tool assemblies, and, more particularly, to an identification system used in conjunction with a cutter tool assembly.

2. Description of the Related Art

A machining tool such as a cutting tool is typically carried by a tool holder, which in turn is carried by a machine such as a mill, lathe, etc. It is known to provide the tool holder with an electrically readable identifier which identifies characteristics of the tool carried thereby. For example, a bar code label may be applied to the tool holder, which is then scanned using a laser scanner to identify characteristics of the tool carried by the tool holder. The characteristics may include the type of tool, particular serial number identified with the tool, time in use, etc.

It is also known to provide a non-volatile memory device within the tool holder which is interrogated by an interrogation unit using a wireless technique such as inductive coupling, etc. A problem with an identification system for cutting tools as identified above using a non-volatile memory is that the tool holder itself carries the identification data corresponding to characteristics of the cutting tool carried thereby. If the cutting tool is mistakenly coupled with the wrong cutting tool holder, then a desired cutting operation is either impossible or inaccurate.

It is also known to provide an electronically readable indicator on a cutting tool rather than the cutting tool holder for identifying characteristics associated with the cutting tool. Since the cutting tool typically includes an axial cutting face, such as on a drill bit, end face mill, etc., the electronically readable identifier is positioned on the radial periphery of the cutting tool near the base thereof outside the cutting area of the teeth, flutes, etc. A problem with positioning an electronically readable identifier on the radial periphery of the cutting tool is that the start-up acceleration, tangential velocity, as well as the radially outward centrifugal force exerted on the identifier is maximum on the radial periphery. Accelerations exerted on the electronically readable identifier may be of sufficient magnitude to cause failure over a period of time. Moreover, the radially outward centrifugal force exerted against the electronically readable identifier may cause dislocation and failure thereof.

What is needed in the art is a cutting tool assembly and system having an electronically readable identifier associated with the cutting tool which is easy to operate and program, while at the same time providing improved reliability.

SUMMARY OF THE INVENTION

The present invention provides a cutter tool assembly having a touch memory which is positioned within an axially extending recess formed in the axially end face of a bevel gear cutter head. A touch probe coupled with a personal computer allows data corresponding to characteristics of the cutting tool to be read/written to and from the touch memory.

The invention comprises, in one form thereof, a cutter tool assembly including a cutter head having an axial end face with an axially extending recess in the end face. A plurality of cutter blades are carried by and extend axially from the end face of the cutter head. A non-volatile memory device is disposed within the recess and affixed to the cutter head.

The invention comprises, in another form thereof, a method of identifying at least one characteristic associated with a cutting tool, including the steps of: providing a cutter head having an axial end face with an axially extending recess, and a plurality of cutter blades carried by and extending axially from the end face; positioning a non-volatile memory device within the recess; and affixing the non-volatile memory device to the cutter head.

An advantage of the present invention is that the non-volatile memory device in the form of a touch memory is carried directly by the cutting tool, rather than the cutting tool holder.

Another advantage is that data and power are transmitted in a wireless manner between the touch memory and the touch probe.

Yet another advantage is that the touch memory is positioned in the axial end face of the cutter head to reduce acceleration forces and centrifugal forces exerted against the touch memory, thereby improving reliability of the identification system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
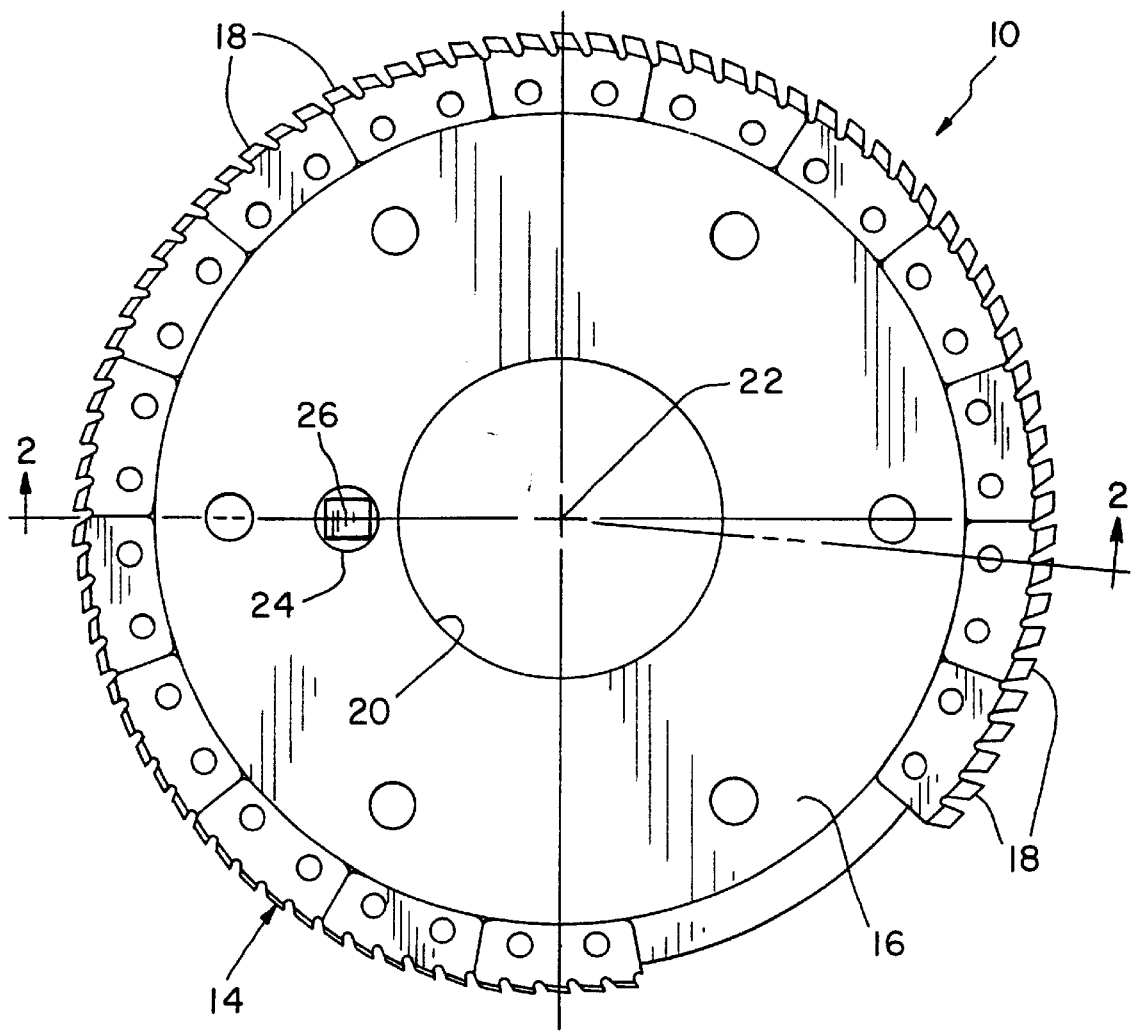
FIG. 1 is perspective view of a cutter assembly of the present invention.
Figure 2:
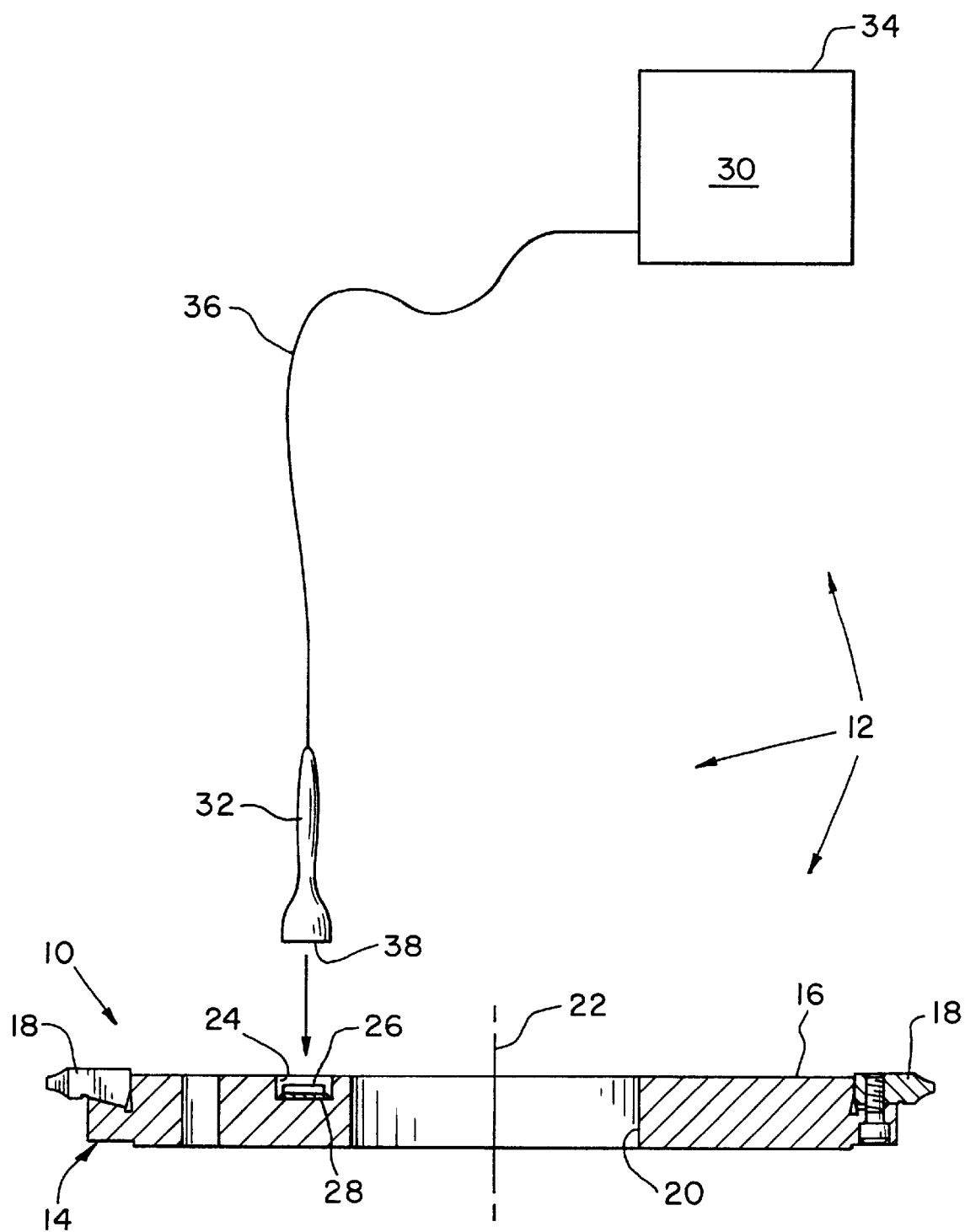
FIG. 2 is a side view of an embodiment of a cutter tool system, including the cutter tool assembly shown in FIG. 1.

Referring now to the drawings, there is shown an embodiment of a cutter assembly 10 (FIG. 1) which forms part of a cutter tool system 12 (FIG. 2). Cutter tool assembly 10 generally includes a cutter head 14 having an axial end face 16. End face 16 may include multiple adjoined surfaces (such as a TRIAC cutter) or may be generally planar, as shown in the embodiment of FIG. 1. Cutter head 14 includes a plurality of cutter blades 18 which are carried by and extend axially from end face 16. Cutter head 14 includes a centrally located bore 20 defining an axis of rotation 22. Bore 20 allows interconnection with a machine for rotatably driving cutter tool assembly 10 about axis of rotation 22. Cutter blades 18 are positioned in at least one row concentrically about axis of rotation 22. In the embodiment shown, cutter head 14 is a bevel gear cutter including cutter blades 18 which are positioned in a single row concentrically about axis of rotation 22. Bevel gear cutter 4 may be an intersecting or non-intersecting bevel gear cutter, such as a face milling cutter, face hobbing cutter or straight bevel gear cutter. Manufacturers of such bevel gear cutters include Gleason and Oerlikon.

Cutter head 14 also includes an axially extending recess 24 which is formed in end face 16 between bore 20 and the single, concentric row of cutter blades 18. Recess 24 may be positioned at any desired location on end face 16 between bore 20 and cutter blades 18, and preferably is positioned closer to bore 20. By maintaining recess 24 closer to bore 20, the acceleration at start-up as well as centrifugal forces associated with the position of recess 24 are reduced.

A non-volatile memory device 26 is positioned within recess 24. Non-volatile memory device 26, in the embodiment shown, is in the form of a touch memory. More particularly, touch memory 26 is a DS 1900 series touch memory manufactured by Dallas Semiconductor. The touch memory is preprogrammed with a unique serial number that is lasered into the chip. The touch memory is a read/write device that is capable of holding up to 64K bits of information. Touch memory 26 may be held within recess 24 using any suitable attachment method, such as by using an adhesive 28.

Although non-volatile memory device 26 is shown in the form of a touch memory in the embodiment illustrated in FIGS. 1 and 2, it is also possible to form the non-volatile memory device with other suitable configurations allowing wireless transmission of data, preferably data and power, to and from the memory device. The memory device is preferably powered in a wireless manner, but may also include a long term battery depending upon the particular application.

Cutter tool system 12 includes an electrical processing circuit 30 and a probe 32, in addition to cutter tool assembly 10. Electrical processing circuit 30 may be configured as a digital or analog circuit, and preferably is configured as a digital electrical processing circuit in the embodiment shown. More particularly, electrical processing circuit 30 includes a microprocessor forming part of a Personal Computer (PC) 34. PC 34 of course includes appropriate input/output circuitry for interfacing with probe 32 via electric line 36. PC 34 may include a display monitor and a keyboard, each of which are well known and not shown for clarity sake.

Probe 32 is coupled with electrical processing circuit 30 via line 36, and is adapted to communicate with touch memory 26 within recess 24 in a wireless manner. More particularly, touch probe 32 includes a distal end 38 which is touched against touch memory 26 for powering and communicating in a bi-directional manner with touch memory 26. In the embodiment shown, touch probe 32 is a model DS 9092GT touch probe manufactured by Dallas Semiconductor. Touch probe 32 may be interconnected with PC 34 using a model DS 9097 PC COM port adapter (not shown), also manufactured by Dallas Semiconductor.

During assembly, recess 24 is formed in axial end face 16 of cutter head 14. Touch memory 26 is positioned within recess 24 such that it does not extend above end face 16, thereby inhibiting damage to touch memory 26. Touch memory 26 is adhesive bonded within recess 24 using adhesive 28.

To interrogate touch memory 26, rotational power is not applied to cutter head 14 such that touch memory 26 remains stationary. Touch probe 32 is touched against touch memory 26 to power and communicate in a bi-directional manner with touch memory 26. Data corresponding to at least one characteristic associated with cutting head 14 is transmitted from touch probe 32 to electrical processing circuit within PC 34. The identification data may correspond, e.g., to the serial number of touch memory 26 associated with cutter head 14, the remanufacture date of cutter head 14, the number of hours in use, etc. The information may be utilized and action taken by PC 34, or simply observed by a user on a display screen or print out. To update the identification data on touch memory 26, data is communicated from PC 34 to touch memory 26 while being contacted by probe 32. Thus, selective write and read operations to and from touch memory 26 may be carried out using touch probe 32 and PC 34.

Cutter tool system 12 of the present invention as described above provides a convenient and reliable system for identifying one or more characteristics associated with cutter head 14. The various characteristics associated with cutter head 14 may be utilized by an operator for different purposes, depending upon the particular application of cutter head 14. The data transmitted from touch memory 26 to PC 34 can be displayed in a number of desired formats on a display screen associated with PC 34. For example, electrical processing circuit 30 and the display screen may use or display the data from touch memory 26 in a particular manner when used in a grinding control room; may use or display the data in another manner when used during cutter grinding; and may use or display the data in yet another manner during production. Data manipulation and display of course are well known to those skilled in the art, and thus will not be described in further detail herein.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cutter tool assembly, comprising:
   a cutter head rotatable about an axis having an axial end face extending generally transverse to said axis with a recess in said end face, and a plurality of cutter blades carried by said end face along a periphery thereof; and
   an erasable non-volatile memory device disposed within said recess and affixed to said cutter head.

2. The cutter tool assembly of claim 1, wherein said non-volatile memory device comprises a touch memory.

3. The cutter tool assembly of claim 1, wherein said cutter head includes an axis of rotation and said cutter blades are positioned in at least one row concentrically about said axis of rotation.

4. The cutter tool assembly of claim 3, wherein said non-volatile memory device is disposed radially between said axis of rotation and said at least one row of cutter blades.

5. The cutter tool assembly of claim 3, wherein said cutter head is a bevel gear cutter head having a single row of cutter blades positioned concentrically about said axis of rotation.

6. The cutter tool assembly of claim 5, wherein said bevel gear cutter comprises one of a face milling cutter, face hobbing cutter and straight bevel gear cutter.

7. The cutter tool assembly of claim 6, wherein said non-volatile memory device is disposed radially between said axis of rotation and said single row of cutter blades.

8. The cutter tool assembly of claim 7, wherein said non-volatile memory device comprises a touch memory.

9. The cutter tool assembly of claim 1, further including an adhesive affixing said non-volatile memory device to said cutter head within said recess.

10. The cutter tool assembly of claim 1, wherein said recess extends axially into said end face.

11. A cutter tool system, comprising:
a cutter tool assembly, including:
- a cutter head rotatable about an axis having an axial end face extending generally transverse to said axis with a recess in said end face, and a plurality of cutter blades carried by said end face along a periphery thereof; and
- an erasable non-volatile memory device disposed within said recess and affixed to said cutter head; and an interrogation assembly, including:
- an electrical processing circuit; and
- a probe coupled with said electrical processing circuit, said probe adapted to communicate with said erasable non-volatile memory device in a wireless manner.

12. The cutter tool system of claim 11, wherein said electrical processing circuit comprises a computer, said probe comprises a touch probe, and said non-volatile memory device comprises a touch memory.

13. The cutter tool system of claim 12, wherein said computer comprises a personal computer.

14. The cutter tool system of claim 11, wherein said cutter head includes an axis of rotation and said cutter blades are positioned in at least one row concentrically about said axis of rotation.

15. The cutter tool system of claim 14, wherein said non-volatile memory device is disposed radially between said axis of rotation and said at least one row of cutter blades.

16. The cutter tool system of claim 14, wherein said cutter head is a bevel gear cutter head having a single row of cutter blades positioned concentrically about said axis of rotation.

17. The cutter tool assembly of claim 16, wherein said bevel gear cutter comprises one of a face milling cutter, face hobbing cutter and straight bevel gear cutter.

18. The cutter tool system of claim 17, wherein said non-volatile memory device is disposed radially between said axis of rotation and said single row of cutter blades.

19. The cutter tool system of claim 18, wherein said non-volatile memory device comprises a touch memory.

20. The cutter tool assembly of claim 11, wherein said recess extends axially into said end face.

21. A method of identifying at least one characteristic associated with a cutting tool, comprising the steps of:
providing a cutter head rotatable about an axis and having an axial end face extending generally transverse to said axis with an axially extending recess, and a plurality of cutter blades carried by said end face along a periphery thereof;

positioning an erasable non-volatile memory device within said recess; and affixing said erasable non-volatile memory device to said cutter head.

22. The method of claim 21, including the steps of:
coupling a probe with an electrical processing circuit;
positioning said probe in relation to said non-volatile memory; and
communicating at least one characteristic between said non-volatile memory device and said probe in a wireless manner.

23. The method of claim 22, wherein said non-volatile memory device comprises a touch memory and said probe comprises a touch probe, and said communicating step includes touching said probe against said touch memory.

24. The method of claim 21, wherein said affixing step comprises adhesive bonding said non-volatile memory device to said cutter head within said recess.

* * * * *